United States Patent
Craig et al.

(10) Patent No.: US 9,506,317 B2
(45) Date of Patent: Nov. 29, 2016

(54) METHOD OF IMPROVING CLEANOUT OF A WELLBORE

(71) Applicant: Baker Hughes Incorporated, Houston, TX (US)

(72) Inventors: Steven H. Craig, Houston, TX (US); Richard Thomas Koch, Jr., Alice, TX (US); Robert S. Martin, Spring, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 52 days.

(21) Appl. No.: 14/267,663

(22) Filed: May 1, 2014

(65) Prior Publication Data

US 2015/0204161 A1 Jul. 23, 2015

Related U.S. Application Data

(60) Provisional application No. 61/929,799, filed on Jan. 21, 2014.

(51) Int. Cl.
| | | |
|---|---|---|
| *E21B 33/138* | (2006.01) | |
| *C09K 8/524* | (2006.01) | |
| *E21B 37/00* | (2006.01) | |
| *E21B 21/00* | (2006.01) | |
| *C09K 8/516* | (2006.01) | |
| *C09K 8/52* | (2006.01) | |

(52) U.S. Cl.
CPC ............. *E21B 33/138* (2013.01); *C09K 8/516* (2013.01); *C09K 8/52* (2013.01); *C09K 8/524* (2013.01); *E21B 21/003* (2013.01); *E21B 37/00* (2013.01); *C09K 2208/00* (2013.01)

(58) Field of Classification Search
None
See application file for complete search history.

(56) References Cited

U.S. PATENT DOCUMENTS

| | | | | |
|---|---|---|---|---|
| 4,216,828 A | * | 8/1980 | Blair, Jr. ................ | C09K 8/885 166/275 |
| 4,621,692 A | * | 11/1986 | Mondshine ............ | C09K 8/572 166/278 |
| 4,726,219 A | * | 2/1988 | Pearson .................. | E21B 43/26 73/152.39 |
| 4,870,167 A | | 9/1989 | Zody et al. | |
| 5,415,030 A | * | 5/1995 | Jogi ........................ | E21B 12/02 175/39 |
| 5,439,059 A | | 8/1995 | Harris et al. | |
| 5,566,760 A | | 10/1996 | Harris | |
| 5,720,347 A | * | 2/1998 | Audibert .................. | C09K 8/08 166/294 |
| 5,981,447 A | | 11/1999 | Chang et al. | |

(Continued)

FOREIGN PATENT DOCUMENTS

WO    2008068467 A1    6/2008

OTHER PUBLICATIONS

International Search Report, PCT/US2014/036419, pp. 1-6, Sep. 25, 2014.

(Continued)

*Primary Examiner* — Angela M DiTrani
*Assistant Examiner* — Anuradha Ahuja
(74) *Attorney, Agent, or Firm* — John Wilson Jones

(57) ABSTRACT

A barrier onto the surface of a subterranean formation may be formed by pumping into a wellbore within a well hydrophobically modified polysaccharides. A pressure differential is created between the reservoir pressure and formation pressure within the well. The micellular hydrophobically modified polysaccharides self-align onto the face of the formation to form the barrier. Flow of fluids into the subterranean formation is thereby prohibited.

20 Claims, 1 Drawing Sheet

(56) References Cited

U.S. PATENT DOCUMENTS

| | | | | |
|---|---|---|---|---|
| 6,040,276 | A * | 3/2000 | Audibert | C09K 8/10 507/202 |
| 6,637,517 | B2 | 10/2003 | Samuel et al. | |
| 7,090,018 | B2 | 8/2006 | Livingstone | |
| 8,546,559 | B2 | 10/2013 | Langella et al. | |
| 8,887,809 | B2 * | 11/2014 | Ezell | C09K 8/12 166/279 |
| 2003/0139297 | A1 * | 7/2003 | Quintero | C09K 8/28 507/100 |
| 2004/0147405 | A1 * | 7/2004 | Alsobrook | C09K 8/032 507/100 |
| 2004/0209780 | A1 * | 10/2004 | Harris | C09K 8/602 507/117 |
| 2005/0107503 | A1 * | 5/2005 | Couillet | C09K 8/62 524/249 |
| 2006/0118301 | A1 * | 6/2006 | East, Jr. | E21B 43/114 166/280.2 |
| 2007/0272409 | A1 * | 11/2007 | Growcock | C09K 8/516 166/278 |
| 2008/0210428 | A1 | 9/2008 | Javora et al. | |
| 2009/0181866 | A1 * | 7/2009 | Reddy | C09K 8/035 507/211 |
| 2011/0048716 | A1 * | 3/2011 | Ezell | C09K 8/12 166/300 |
| 2011/0048718 | A1 * | 3/2011 | Van Zanten | C09K 8/12 166/305.1 |
| 2011/0053807 | A1 | 3/2011 | Panga et al. | |
| 2011/0056752 | A1 * | 3/2011 | Young | C09K 8/08 175/57 |
| 2011/0155375 | A1 * | 6/2011 | Griffith | E21B 43/1195 166/298 |
| 2012/0048550 | A1 * | 3/2012 | Dusterhoft | C09K 8/508 166/281 |
| 2012/0067643 | A1 * | 3/2012 | Dewitt | E21B 4/18 175/15 |
| 2012/0186877 | A1 * | 7/2012 | Ezell | C09K 8/10 175/57 |

OTHER PUBLICATIONS

SealBond Spacer System Enhanced Cement Bonding, Case History, Sep. 2013.

\* cited by examiner

METHOD OF IMPROVING CLEANOUT OF A WELLBORE

This application claims the benefit of U.S. patent application Ser. No. 61/929,799, filed on Jan. 21, 2014.

FIELD OF THE DISCLOSURE

The disclosure relates to a method of improving the efficiency of cleanouts of subsurface wellbores by pumping into the wellbore a fluid containing micellular hydrophobically modified polysaccharides.

BACKGROUND OF THE DISCLOSURE

The removal of solids in severely depleted wells remains as one of the most challenging intervention operations in the oil and gas industry.

A number of procedures have been employed to date for the cleanout of wellbores. Such procedures include the use of water/gel slugs followed by significant volumes of nitrogen to impart temporary diversion to control fluid loss; the use of foam or linear gels as diversion agents; the use of solid diversion agents, such as benzoic acid flakes and grade calcium carbonate pills; and the use of concentric coiled tubing sand vacuuming. These methods, however, present logistical challenges as they are time consuming and often largely ineffective in the treatment of under hydrostatic pressure wells. Alternatives for the cleanout of wellbores have been sought.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

Accordingly, there exists a need for alternative methods for improving the efficiency of cleaning out depleted wells having one or more of the attributes or capabilities described or shown in, or as may be apparent from, the other portions of this patent.

SUMMARY OF THE DISCLOSURE

In an embodiment of the disclosure, a method is provided of forming a barrier onto the surface of a subterranean formation penetrated by a well and blocking the loss of fluids into the subterranean formation. In the method, micellular hydrophobically modified polysaccharides are pumped into the wellbore within the well. An overbalanced condition is created within the well from the pressure differential which develops between the wellbore and the subterranean formation at the wellbore/subterranean formation interface. The micellular hydrophobically modified polysaccharides self-align onto the surface of the formation at the interface. A barrier to the flow of fluids into the subterranean formation is thereby formed.

In another embodiment, a method of improving the efficiency of a cleanout of a subsurface wellbore within a well penetrating a subterranean formation is disclosed. In this embodiment, a treatment fluid comprising micellular hydrophobically modified polysaccharides is pumped through tubing or piping within the wellbore. An overbalanced condition is created within the well by a pressure differential generated between the wellbore and the subterranean formation at the wellbore/formation interface. The micellular hydrophobically modified polysaccharides then self-align onto the surface of the subterranean formation. Fluids are thereby prevented from being lost into the formation. Fluids containing entrained solids are then flowed from the wellbore.

In another embodiment of the disclosure, a method of controlling fluid loss into a subterranean formation penetrated by a well is provided. The well is initially at balanced or in an underbalanced condition. A fluid comprising micellular hydrophobically modified polysaccharides is pumped into the wellbore. A pressure differential between the wellbore and the subterranean formation is created within the well. This enables the micellular hydrophobically modified polysaccharides to self-align along the face of the subterranean formation and be adsorbed. An impermeable barrier is thereby formed into the subterranean formation. The loss of fluids into the subterranean formation may be prevented by the impermeable barrier.

In another embodiment of the disclosure, a method of removing solids from a wellbore within a well penetrating a subterranean formation is provided. A treatment fluid comprising micellular hydrophobically modified polysaccharides is pumped through tubing or piping within the well when the well is in a balanced condition or underbalanced condition. An overbalanced condition is created within the well from a pressure differential between the wellbore and the subterranean formation. The micellular hydrophobically modified polysaccharides self-align onto the surface of the subterranean formation. Loss of fluids into the formation is thereby prevented. Fluids containing solids may then be removed from the wellbore.

Accordingly, the present disclosure includes features and advantages which are believed to minimize or prevent the loss fluid into a subterranean formation. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF THE PREFERRED EMBODIMENTS

Figure 1:
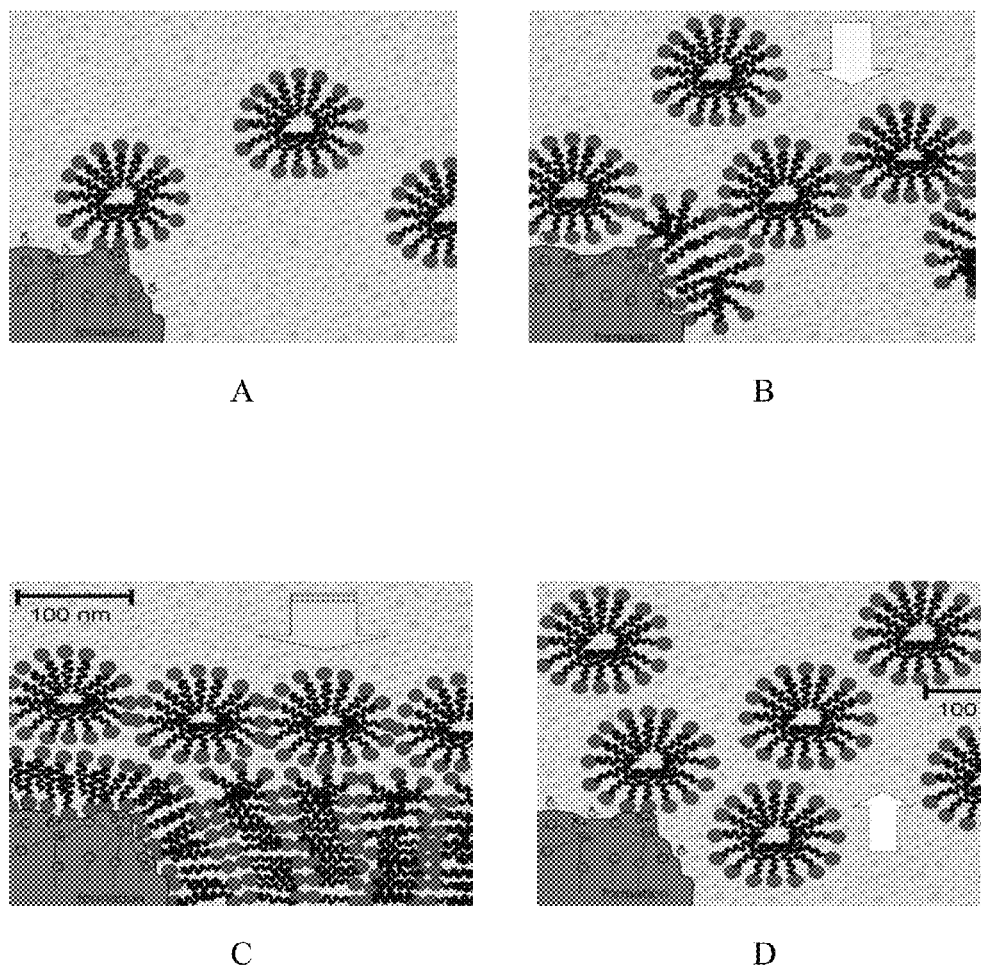
FIGS. 1A, B, C and D demonstrate the change in adsorption and alignment of hydrophobically modified polysaccharides in response to an in-situ created pressure differential in accordance with the disclosed method.

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of exemplary embodiments, are not intended to be limiting to the claims. On the contrary, the intention is to cover all modifications, equivalents and alternatives falling within the spirit and scope of the claims.

Many changes may be made to the particular embodiments and details disclosed herein without departing from such spirit and scope.

As used herein and throughout various portions (and headings) of this patent application, the terms "disclosure", "present disclosure" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . "

The disclosure allows for the clean out of wellbores in a safe manner and with less damage to the formation penetrated by the wellbore. In the method, micellular hydrophobically modified polysaccharides are pumped into the wellbore and act as a temporary blocking agent. The temporary blocking agent is particularly effective in low and hydrostatic pressure reservoirs since they minimize damage to or fluid invasion into the formation. The blocking agent is especially designed to provide fluid loss control in depleted wells. The blocking agent can be used, for instance, to seal open holes and perforations in such wells.

In a preferred embodiment, the hydrophobically modified polysaccharides are used in the treatment of gas or oil wells which have been blocked or restricted from formation material such as shale, stimulation material such as fracturing sand or acid, drilling fluids, cuttings, etc. Such wells may have depths exceeding 10,000 feet and may exhibit bottom hole pressures during the method disclosed herein.

Such wells may be entirely vertical, deviated or include horizontal sections.

The hydrophobically modified polysaccharides are particularly effective in cleaning out low and under hydrostatic pressure reservoirs such as low permeability or tight reservoirs, which may consist of shallow gas wells, coal bed methane and shale gas.

Such reservoirs are more susceptible to formation damage due to the introduction of non-native fluids.

The blocking agent is composed of micellular hydrophobically modified polysaccharides. As depicted in FIG. 1, such blocking agents may be adsorbed onto the interface of the wellbore and the subterranean formation penetrated by the well undergoing treatment. In addition, the blocking agent may be adsorbed into perforations extending into the formation.

When a pressure differential is created within the well, polar groups of molecules of the blocking agent are aligned with polar groups of other molecules of the blocking agent; non-polar groups of molecules of the blocking agent are aligned with non-polar groups of other molecules of the blocking agent. Such self-assembly occurs when the well is overbalanced. When the well is underbalanced or at balanced, the polar and non-polar groups of molecules of the blocking agent are not aligned with each other. Thus, the molecules of the blocking agent are non-aligned at underbalanced or balanced conditions such that similar polar groups and non-polar groups are not aligned with each other. The in-situ self-alignment of molecules based on the polarity of functional groups as described herein may also be referred to as micellarization. Micellarization of the hydrophobically modified polysaccharides is thus attributable to the overbalanced condition of the well. At overbalanced conditions, micellarization of the hydrophobically modified polysaccharides occurs in-situ as the polar and non-polar groups of molecules aggregate with each other. At underbalanced or at balanced conditions, micellarization of the hydrophobically modified polysaccharides no longer occurs.

Changes in the condition within the well may be effectuated by the pressure differential between the wellbore and the subterranean formation. FIG. 1A shows the dynamic equilibrium of the micellular hydrophobically modified polysaccharides between adsorption (onto the face of the surface of the formation or within perforations within the formation) and suspension within fluids. As more and more perforations are plugged within the well, the pressure differential within the well increases. FIG. 1B shows a greater percentage of the micellular hydrophobically modified polysaccharides being adsorbed and aligned along the face of the surface of the formation and the perforations within the formation. At maximum pressure differential, the adsorbed micelles are transformed into an impermeable barrier, illustrated in FIG. 1C. Flow from the opposite direction, illustrated in FIG. 1D, transforms the barrier back into micellular hydrophobically modified polysaccharides suspended within well fluids.

Examples of hydrophobically modified polysaccharides include hydrophobically modified guar, hydrophobically modified hydroxyalkyl guar, hydrophobically modified carboxyalkyl guar, hydrophobically modified carboxyalkyl hydroxyalkyl guar, hydrophobically modified hydroxyalkyl cellulose, hydrophobically modified carboxyalkyl cellulose, hydrophobically modified carboxyalkyl hydroxyalkyl cellulose, hydrophobically modified alkyl ethers of cellulose and mixtures thereof.

In an embodiment, the hydrophobically modified polysaccharide is hydrophobically modified guar, hydrophobically modified carboxymethylguar, hydrophobically modified hydroxyethylguar, hydrophobically modified hydroxypropylguar, hydrophobically modified carboxymethylhydroxypropylguar, hydrophobically modified hydroxybutyl guar or hydrophobically modified cationic guar, hydrophobically modified hydroxymethyl cellulose, hydrophobically modified carboxymethyl hydroxymethyl cellulose, hydrophobically modified carboxymethyl cellulose or a mixture thereof.

Preferred hydrophobically modified polysaccharides are hydrophobically modified guar (HMG) such as those having two alkyl substituents.

Methods for synthesizing hydrophobically modified guar are set forth in U.S. Pat. No. 4,870,167, herein incorporated by reference. The hydrophobic groups in the hydrophobically modified guar are grafted on to the guar polymer molecules in two steps. First an alkyl substituent selected from the group consisting of R and $HOR^1$, wherein R is an alkyl group containing one to four carbon atoms, wherein $R^1$ is an alkylene group containing two to four carbon atoms and wherein the OH group is on the carbon atom beta to the ether group. Accordingly, the alkyl ethers of guar first formed are the methyl, ethyl, propyl, butyl hydroxyethyl, hydroxypropyl and hydroxy butyl ethers of guar. The second alkyl substituent is selected from the group consisting of $R_2$, $HOR^3$, and $R^4OCH_2CH(OH)CH_2$— wherein $R^2$ is an alkyl group which contains about 8 to about 28 carbon atoms, wherein $R^3$ is an alkylene group which contains about 8 to about 28 carbon atoms having the OH group on the carbon atom beta to the ether group and wherein $R^4$ is an alkyl group containing about 5 to 25 carbon atoms. The first alkyl substituent may be present in a molecular substitution of about 0.3 to about 1.5. The second alkyl substituent may be present in a molecular substitution of about 0.001 to about 0.2 with the preferred molecular substitution being about 0.005 to about 0.10.

Suitable hydrophobically modified cationic guars include those set forth in U.S. Pat. No. 8,546,559, herein incorporated by reference, and suitable hydrophobically modified hydroxymethylcelluloses are those discussed in "Water-Soluble Polymers; Synthesis, Solution Properties and Applications", Shalaby, S. W., McCormick, C. L. and Butler, G. W., A.C.S. Symposium Series, No. 467, 1991, herein incorporated by reference.

The hydrophobically modified polysaccharide used in the method herein is effective in the removal of fill accumulated and may include accumulated solid particles, sediment and/or injection fluids including fracturing acids, sands, proppants, weighting materials, gun debris, accumulated powder, crushed sandstone, well rock, formation debris, etc. Removal of fill from the wellbore maximizes the flow of hydrocarbons. By forming a temporary barrier within the formation, the hydrophobically modified polysaccharide minimizes formation damage. Unlike gelled based systems, the liquid only system disclosed herein causes little, if any, formation damage.

Typically, a fluid containing the hydrophobically modified polysaccharide is pumped into the well through tubing. Suitable tubings include coiled tubing as well as jointed pipes. The method disclosed herein is particularly effective in coiled tubing operations, especially when the reservoir being treated is a highly deviated or tortuous well.

Forces may be applied to deliver a downhole tool at the end of the coiled tubing. Fill may then be cleaned from the wellbore by running the coiled tubing assembly in hole (RIH) while circulating the clean out fluid containing the hydrophobically modified polysaccharide through a nozzle or motor/mill assembly having a jetting action directed downhole.

In operation, the tubing is run near to the perforation depth within an underbalanced well (below hydrostatic pressure). A fluid containing the micellular hydrophobically modified polysaccharides is then introduced into the well through the tubing. The well is initially underbalanced or at a balanced condition. Pressure in the wellbore is then elevated until it exceeds the pressure of fluids in the formation. Under differential pressure, the micelles adsorb and realign themselves in a layer along the interface of the wellbore and subterranean formation or along the perforation tunnel to form a temporary impermeable barrier. The barrier effectively blocks the loss of fluids into the formation. Fluid loss into the perforations or formations is minimized by the creation of the temporary barrier.

The overbalanced condition of the well is the result of the positive differential pressure. It is this differential which enables micellularization of the hydrophobically modified polysaccharides to occur.

After micellularization, fluid pumping rates may be changed within the wellbore to allow for fluid returns to the surface. In operation, the tubing may be pulled out of the wellbore (POOH).

The velocity of the cleanout fluid and entrained fill through the remaining part of the annulus will be sufficiently high to remove entrained solids from the well. The remaining fill will then be transported out of the hole. In horizontal or deviated wells, pulling out of the hole picks up the leading or downhole edge of the equilibrium bed, disturbs and entrains the leading edge and sends the fill up the hole past the equilibrium bed to the surface. Establishing equilibrium within the uphole edge of the bed, the entrained fill at the leading or downhole end of the equilibrium bed may then be transported to the surface.

The amount of micellular hydrophobically modified polysaccharides introduced into the well is at least the amount sufficient to create a temporary barrier at the face of the formation and/or along perforations within the formation. Typically, the amount of hydrophobically modified polysaccharides in the fluid pumped into the well is typically from about 200 lbs per 1000 gal of aqueous fluid to about 600 lbs per 1000 gal of aqueous fluid. Additional slugs of hydrophobically modified polysaccharides may be circulated as additional perforations are uncovered during cleanout.

After returns are sufficient, the production casing/tubing may be returned to an underbalanced or at balanced system. The removal of the differential pressure transforms the barrier back into micelles, returning it to its original fluid state and permitting flow from the reservoir. The process may then be repeated.

No additional chemical treatments are required to remove the micellular hydrophobically modified polysaccharides from the wellbore/formation interface.

The production casing/tubing may be returned to the underbalanced or at balanced state by reducing the hydrostatic pressure of the production fluid column. The underbalanced state results when the wellbore pressure is lower than the formation pressure.

One such method for reducing the hydrostatic pressure is by gas lifting wherein a gas, such as nitrogen, reduced oxygen air, processed flue gas or natural gas, is pumped through coiled tubing or injected into the production tubing and returned up the production casing/tubing annulus. The resulting reduction in bottomhole pressure allows the reservoir liquids to enter the wellbore at a higher flow rate. The injection gas is typically conveyed down the tubing-casing annulus and enters the production train through a series of gas-lift valves. Further, a lower density brine may also be used to reduce the wellbore pressure below the pore pressure of the formation.

Preferred embodiments of the present disclosure thus offer advantages over the prior art and are well adapted to carry out one or more of the objects of this disclosure. However, the present disclosure does not require each of the components and acts described above and are in no way limited to the above-described embodiments or methods of operation. Any one or more of the above components, features and processes may be employed in any suitable configuration without inclusion of other such components, features and processes. Moreover, the present disclosure includes additional features, capabilities, functions, methods, uses and applications that have not been specifically addressed herein but are, or will become, apparent from the description herein, the appended drawings and claims.

All percentages set forth in the Examples are given in terms of weight units except as may otherwise be indicated. Testing was performed at 70° F. and the sample fluid in each of the Examples, available from Baker Hughes Incorporated as SealBond™ cement spacer, contained a hydrophobically modified polysaccharide.

EXAMPLES

Examples 1-4

Berea sandstone cylindrical plugs measuring 1.5" in diameter and 1.5" in and having nitrogen permeability of 200 md were evacuated were dried to stable weight in a 150° F. convection oven. The plugs were then evacuated and pressure saturated with 2% KCl brine and then filtered and evacuated. The plugs were then loaded into an ambient temperature, vertically oriented hydrostatic coreholder. A net confining pressure of either 1500 psi (Examples 1 and 3) or 3500 psi (Examples 2 and 4) was applied. A ¼ inch spacer was placed on the injection side of each of the plugs to allow the sample fluid to come in contact with as much of the face as possible. The plugs in Examples 1 and 2 were injected with 2% KCl from the formation (production) side of the core until stable differential pressure was noted. For Examples 3 and 4, ISOPAR™ paraffinic fluid of ExxonMobil Chemical Company followed the injection of KCl (brine). Oil flow continued at 6 cc/min until a stable differential pressure was reached.

The sample fluid was mixed and loaded into a separate floating piston accumulator and attached to the injection side of each the plugs with a ¼ in. diameter line to ensure adequate flow across the injection face of the plug. Approximately 50 cc of the sample fluid was flowed across the face of the plug into the spacer, to assure complete coverage. The outlet side of the injection face was capped off to allow flow only through the sample.

The sample fluid was bullheaded onto the injection face at different pressures. The sample fluid was injected at a rate of 1 cc/min until the bullhead pressure was reached. The bullhead pressure was maintained at constant pressure for 20 minutes. Effluent from the production side was captured over time. Pressure was slowly released on the injection side by 50 psi increments so as to not prematurely lift-off the layer of sample fluid. Once the differential pressure was equalized, the accumulator with 2% KCl (Examples 1 and 2) or ISOPAR (Examples 3 and 4) was re-attached to the production side of the core holder.

The pump was then switched back to constant flow. To determine an accurate lift-off pressure, the beginning rate was at 0.001 cc/min. The rates were increased slowly (as needed) to 0.005 cc/min, 0.01 cc/min, 0.05 cc/min, 0.1 cc/min, 0.5 cc/min, 1 cc/min, and 3 cc/min. Positive pressure was recorded at each flow rate. The results are set forth in Table I wherein Lift-Off pressure refers to the pressure at which the sample fluid, previously injected onto a core endface, can be moved off that endface by pressure injected from the opposing endface.

TABLE I

| Ex. No. | 20 minute injection Sample Fluid Bullhead Pressure, psi | Lift Off Pressure, psi |
| --- | --- | --- |
| 1 | 400 | 1.6 |
| 2 | 3000 | 27 |
| 3 | 400 | 1.5 |
| 4 | 3000 | 14 |

Table I illustrates that high pressures can be withstood during fluid flow from wellbore to formation and production is attained with the application of nominal pressure in the direction of flow after removal of constraining pressure.

The methods that may be described above or claimed herein and any other methods which may fall within the scope of the appended claims can be performed in any desired suitable order and are not necessarily limited to any sequence described herein or as may be listed in the appended claims. Further, the methods of the present disclosure do not necessarily require use of the particular embodiments shown and described herein, but are equally applicable with any other suitable structure, form and configuration of components.

While exemplary embodiments of the disclosure have been shown and described, many variations, modifications and/or changes of the system, apparatus and methods of the present disclosure, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the disclosure and scope of appended claims. Thus, all matter herein set forth or shown in the accompanying drawings should be interpreted as illustrative, and the scope of the disclosure and the appended claims should not be limited to the embodiments described and shown herein.

What is claimed is:

1. A method of cleaning solids out of a depleted well penetrating a subterranean formation, the method comprising:
   (a) pumping into the depleted well a micellular hydrophobically modified polysaccharide having polar groups and non-polar groups, wherein the depleted well is in an underbalanced condition;
   (b) creating an overbalanced condition within the depleted well by creating a pressure differential between the wellbore and the subterranean formation;
   (c) self-aligning the polar groups and the non-polar groups of the micellular hydrophobically modified polysaccharide onto a surface of the subterranean formation while the depleted well is in an overbalanced condition;
   (d) forming a barrier to flow of fluids into the subterranean formation from the self-aligned polar groups and non-polar groups of the micellular hydrophobically modified polysaccharide; and
   (e) flowing entrained solids from the depleted well.

2. The method of claim 1, wherein the depleted well is a gas well or oil well.

3. The method of claim 1, wherein the micellular hydrophobically modified polysaccharide is pumped into the wellbore through coiled tubing or jointed pipe.

4. The method of claim 1, wherein the micellular hydrophobically modified polysaccharide is a hydrophobically modified guar or a hydrophobically modified cellulose.

5. The method of claim 4, wherein the micellular hydrophobically modified polysaccharide is a hydrophobically modified guar selected from the group consisting of hydrophobically modified hydroxyalkyl guars, hydrophobically modified carboxyalkyl guars, hydrophobically modified carboxyalkyl hydroxyalkyl guars, and mixtures thereof.

6. The method of claim 5, wherein the micellular hydrophobically modified polysaccharide is selected from the group consisting of hydrophobically modified hydroxypropyl guar (HPG), hydrophobically modified carboxymethyl guar (CMG) and hydrophobically modified carboxymethylhydroxypropyl guar (CMHPG) and mixtures thereof.

7. The method of claim 4, wherein the micellular hydrophobically modified polysaccharide is a hydrophobically modified cellulose selected from the group consisting of hydrophobically modified hydroxymethyl cellulose, hydrophobically modified carboxymethyl hydroxymethyl cellulose, hydrophobically modified carboxymethyl cellulose and mixtures thereof.

8. A method of improving efficiency of a cleanout of a subsurface wellbore within a well penetrating a subterranean formation, the method comprising:
 (a) pumping a treatment fluid into tubing or piping within the wellbore, wherein the treatment fluid comprises micellular hydrophobically modified polysaccharides having polar groups and non-polar groups;
 (b) creating an overbalanced condition within the well by generating a pressure differential between the wellbore and the subterranean formation;
 (c) adsorbing the micellular hydrophobically modified polysaccharides onto a surface of the subterranean formation while the well is in the overbalanced condition, wherein the polar groups and non-polar groups of the micellular hydrophobically modified polysaccharides self-align along the surface of the subterranean formation, thereby preventing loss of fluids into the subterranean formation and fluid flow from the subterranean formation;
 (d) creating an underbalanced or balanced condition by changing alignment of the polar groups and non-polar groups such that the polar groups and non-polar groups are no longer aligned within the well; and
 (e) flowing fluids containing entrained solids from the wellbore.

9. The method of claim 8 wherein the balanced condition or an underbalanced condition in step (d) is created by de-adsorbing the micellular hydrophobically modified polysaccharides from the surface of the subterranean formation.

10. The method of claim 9, wherein the underbalanced condition is created by gas lifting.

11. The method of claim 8, further comprising repeating steps (b) through (e).

12. The method of claim 8, wherein the wellbore is within a gas well or an oil well.

13. The method of claim 8, wherein the micellular hydrophobically modified polysaccharides are hydrophobically modified guars or hydrophobically modified celluloses or a mixture thereof.

14. A method of controlling fluid loss into a coal bed methane reservoir or a shale gas reservoir, wherein the reservoir is penetrated by a wellbore, the method comprising:
 (a) pumping into the wellbore a fluid comprising micellular hydrophobically modified polysaccharides having polar groups and non-polar groups;
 (b) creating a pressure differential between the wellbore and the reservoir at least for a time sufficient for the polar groups and the non-polar groups of the micellular hydrophobically modified polysaccharides to self-align between the wellbore and the reservoir at an interface of the wellbore and reservoir and to create a temporary blocking agent to prevent loss of fluids into the reservoir; and
 (c) flowing, from the reservoir, solids entreated within a fluid.

15. The method of claim 14, wherein the fluid comprising micellular hydrophobically modified polysaccharides is pumped into the wellbore through coiled tubing or jointed pipe.

16. The method of claim 14, wherein the micellular hydrophobically modified polysaccharides are selected from the group consisting of hydrophobically modified carboxymethylguar, hydrophobically modified hydroxyethylguar, hydrophobically modified hydroxypropylguar, hydrophobically modified carboxymethylhydroxypropylguar, hydrophobically modified hydroxybutyl guar, hydrophobically modified hydroxymethyl cellulose, hydrophobically modified carboxymethyl hydroxymethyl cellulose, hydrophobically modified carboxymethyl cellulose and mixtures thereof.

17. The method of claim 14, wherein the reservoir is the shale gas reservoir.

18. A method of removing accumulated fill during cleanout of a depleted wellbore within a well penetrating a subterranean formation, the method comprising:
 pumping through tubing or piping within the depleted well when the depleted well is in a balanced condition or underbalanced condition a treatment fluid comprising micellular hydrophobically modified polysaccharides having polar groups and non-polar groups, wherein the amount of hydrophobically modified polysaccharides in the treatment fluid is between from about 200 lbs per 1,000 gallons of aqueous fluid to about 600 lbs per 1,000 gallons of aqueous fluid, and generating an overbalanced condition within the well by creating a pressure differential between the wellbore and the subterranean formation;
 (b) allowing the polar groups and the non-polar groups of the micellular hydrophobically modified polysaccharides to self-align onto a surface of the subterranean formation, thereby preventing loss of fluids into the subterranean formation; and
 (c) flowing fluids containing fill out from the depleted well, wherein the fill contains at least one of the following: sand, proppant, weighting materials and gun debris.

19. The method of claim 18, wherein the micellular hydrophobically modified polysaccharides are a hydrophobically modified guar or a hydrophobically modified cellulose or a mixture thereof.

20. The method of claim 19, wherein the micellular hydrophobically modified polysaccharides are selected from the group consisting of a hydrophobically modified hydroxypropyl guar (HPG), a hydrophobically modified carboxymethyl guar (CMG) and a hydrophobically modified carboxymethylhydroxypropyl guar (CMHPG) and mixtures thereof.

* * * * *